July 9, 1963  R. McFARLAND, JR  3,096,966
SEALED BALL VALVE
Filed July 23, 1959  2 Sheets-Sheet 1
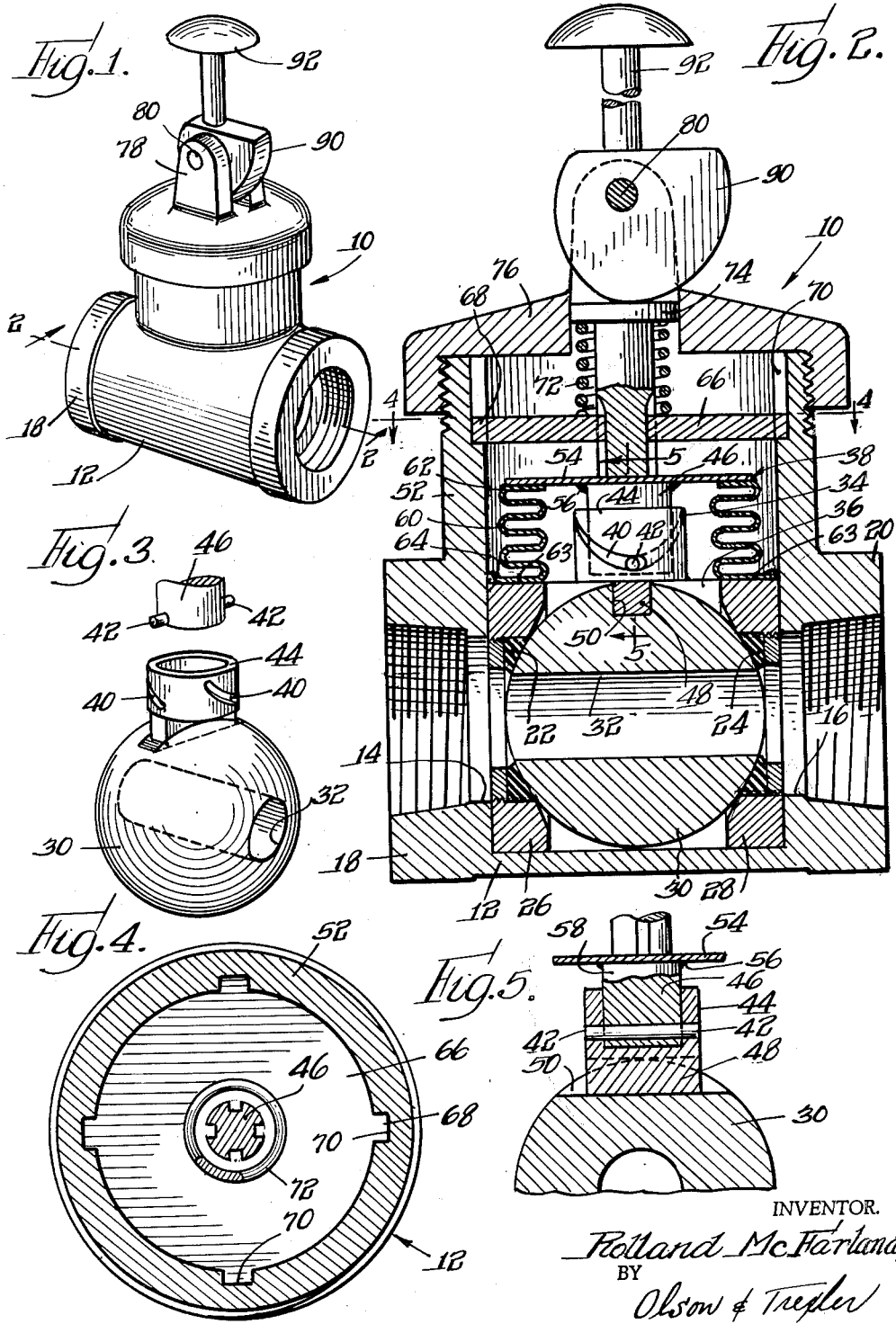
INVENTOR.
Rolland McFarland, Jr.
BY
Olson & Trexler
Attys.

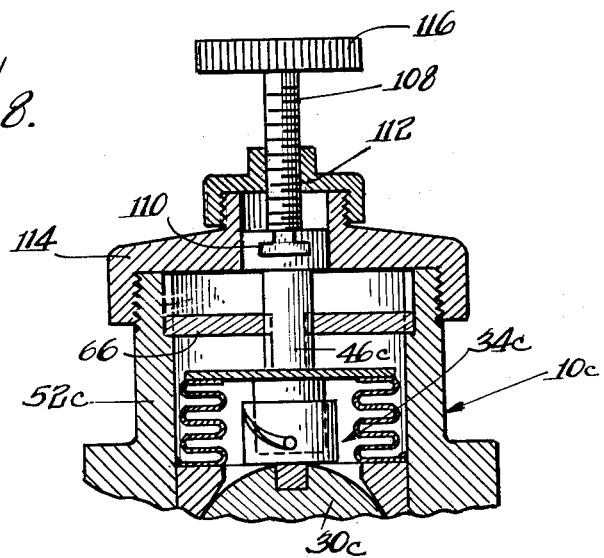
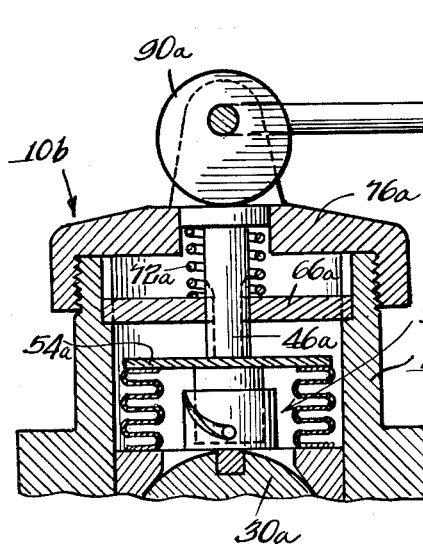
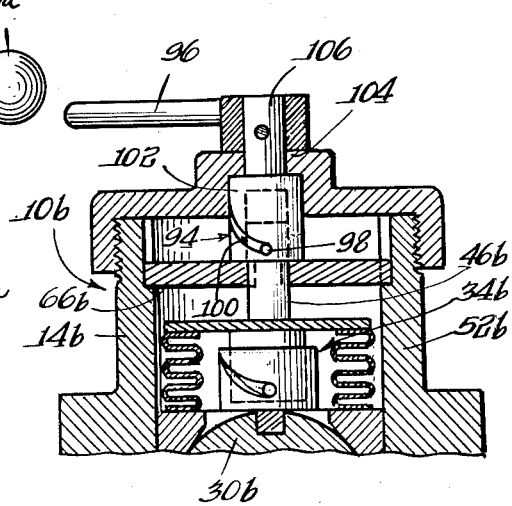

United States Patent Office 3,096,966
Patented July 9, 1963

3,096,966
SEALED BALL VALVE
Rolland McFarland, Jr., Crystal Lake, Ill., assignor to Hills-McCanna Company, Chicago, Ill., a corporation of Illinois
Filed July 23, 1959, Ser. No. 829,127
10 Claims. (Cl. 251—214)

The present invention relates to ball valves through which the flow of fluid is controlled by a spherical plug or ball that is rotatable between open and closed positions. Ball valves have many inherent advantages, some of which are particularly significant in controlling the flow of corrosive fluids. However, the practical problems of designing, manufacturing, and using ball valves are quite difficult and have led to expedients and compromises in the construction of such valves that have been subject to persistent shortcomings and inadequacies.

One object of the invention is to provide an improved ball valve having improved actuating and sealing means which provides an impervious seal against the escape of fluid from the valve by any path other than the inlet and outlet connections to the valve.

A further object is to provide an improved ball valve which, except for necessary inlet and outlet connections to the valve, is completely sealed against the escape of fluid by impervious sealing elements designed in a manner which provides impervious joints between the elements which are not subject to leakage.

Another object is to provide an improved ball valve which is positively sealed against all leakage of fluid to the external environment by improved means which contains the valve ball in a chamber which, except for the usual inlet and outlet connections to the valve, is hermetically sealed by means which provides for rotating the ball within the chamber by externally applied operating forces which are transmitted to the ball without retardation or resistance by the hermetically sealed chamber-defining means.

Another object of the invention is to provide an improved ball valve as set forth in the foregoing objects which positively excludes leakage or seepage of fluid from the valve over a long service life of hard usage while at the same time obviating any need for servicing the valve in order to maintain its fluid-tight integrity in relation to the external environment.

A further object is to provide an improved and hermetically sealed ball valve in which the features and advantages set forth in the preceding objects are achieved by means of an improved valve construction which is well suited for mass production manufacture and commercial usage.

Another object is to provide an improved ball valve in which a valve ball and rotary actuating means therefor are hermetically sealed from the external environment, except for the usual inlet and outlet connections to the valve, by improved means which maintains the hermetically sealed character of the valve chamber while providing for actuation of the valve by operating means which is most advantageous in the service in which the valve is to be used.

Other objects and advantages will become apparent from the following description of the exemplary forms of the invention illustrated in the drawings, in which:

FIGURE 1 is a perspective of a valve embodying the invention;

FIG. 2 is a longitudinal sectional view of the valve on an enlarged scale taken along the line 2—2 of FIG. 1;

FIG. 3 is a fragmentary perspective view of the valve ball and coacting actuating structure for rotating the ball;

FIG. 4 is a transverse sectional view taken along the line 4—4 of FIG. 2;

FIG. 5 is a fragmentary sectional view taken along the line 5—5 of FIG. 2;

FIG. 6 is a fragmentary sectional view similar to the upper portion of FIG. 2, but showing a modification of the manual valve-operating structure;

FIG. 7 is a view similar to FIG. 6 but showing another modification of the manual valve-operating structure; and FIG. 8 is a view similar to FIG. 6 but showing another modification of the manual valve-operating structure.

Referring to the drawings in greater detail, the valve 10 shown in FIGS. 1 to 5 and forming the first illustrated embodiment of the invention comprises a valve body or housing 12, which defines in opposite sides of the body two concentric connecting ports or passages 14, 16. Normally the passages 14, 16 are connected to coacting pipes or conduits (not shown) threaded into annular connecting elements 18 and 20 formed on the valve body in concentric relation to the passages.

A pair of annular valve seats 22, 24 are supported inside the valve body 12 in opposed alinement with each other and in concentric alinement with the respective connecting passages 14 and 16 by suitable valve seat supports 26, 28 positioned inside the valve body as shown. The two annular seats 22, 24 are shaped to fit against opposite sides of an intervening spherical valve plug or ball 30.

The valve ball 30 defines a central bore or flow passageway 32 having a diameter substantially equal to the openings through the valve seats 22, 24. The orientation of the bore 32 in the ball 30 is such that opposite ends of the bore register with the seats 22, 24, as shown in FIG. 2, when the valve is in open position. The valve is closed by rotating the ball 30 a quarter-turn about an axis perpendicular to the bore 32.

Ball valves of this type have many worthwhile inherent advantages in a number of environments. For example, ball valves can be used to advantage in controlling the flow of corrosive fluids. However, such fluids can sometimes create many troublesome problems and difficulties if allowed to seep or leak out of the fluid systems in which they are contained.

In accordance with the present invention improved means are provided for operating the improved ball valve 10 while at the same time positively precluding any leakage or seepage whatsoever of fluid from the valve. As shown in the drawings, the valve ball 30 and ball-rotating transmission 34, adapted to be operated by externally applied actuating force in a manner to be described, are contained within an inner valve chamber 36 which, except for the connecting passages 14 and 16, is hermetically sealed from the external environment by structure 38 which provides for operation of the ball-rotating transmission 34 by mechanical forces that are externally developed and applied to the ball-rotating means without impairing the fluid-tight integrity of the valve chamber 36.

The ball-rotating transmission 34 has a construction capable of transforming linear input motion into a rotary output motion which turns the valve ball between open and closed positions. Preferably, the transmission 34 comprises a cam 40 and cam follower 42 which are reciprocable relative to each other and which interfit together to force rotary movement of the cam and follower in opposite directions relative to each other as an incident to relative reciprocation of the cam follower.

As shown, the cam 40 is formed by a helical cam groove (also denoted by the number 40) defined by the cylindrical wall of a cup element 44 fixed to the ball 30 in concentric relation to the rotary axis of the ball. Preferably, the cam groove is duplicated on opposite sides of the cup 44 to form a pair of identical grooves 40, as shown. These grooves receive two identical followers 42 which are formed by opposite ends of a pin extending transversely through and projecting beyond an actuating plunger 46 which fits into the cup 44, as shown in FIGS. 2, 3 and 5, for reciprocation relative to the cup.

In this instance, the cam-defining cup 44 is mounted on the valve ball 30 by a tang 48 on the bottom of the cup which is fixed in a slot 50 in the ball.

The valve-actuating transmission 34 thus formed extends from the valve ball 30 into space encircled by a hollow protuberance or bonnet 52 integral with the valve body 12.

The reciprocable plunger 46 extends outwardly from the rotary cup 44 through a centrally apertured disk 54 transversely positioned within the bonnet 52. The plunger 46 and the encircling inner periphery of the disk 54 are joined together by a continuous circumferential joint which is absolutely impervious to the flow of fluid between the disk and the plunger. As shown, a rigid, impervious joint is formed between the plunger 46 and the disk 54 by brazing or welding (as indicated by the number 56) the inner periphery of the disk to a shoulder 58, FIG. 5, on the plunger.

The outer periphery of the disk 54 is connected to the encircling structure of the valve body 14 by an absolutely impervious, circumferentially continuous means which provides for substantially unresisted linear motion of the disk 54 and plunger 46 along the axis of the plunger.

For this purpose, the outer periphery of the disk 54 is joined to one end of a bellows 60, which has an absolutely impervious metal construction extending from end to end of the bellows. As shown, the bellows 60 extends inwardly from the disk 54 toward the valve 30. The bellows 60 is designed to have a capacity to elongate and contract sufficiently to provide for the operating of linear movement of the plunger 46.

The circumferential marginal edge of the disk 54 is joined to the adjacent end of the bellows 60 by brazing, welding or other joining means which forms an impervious, fluid-tight connection between the disk and bellows.

The opposite end of the bellows 60 is connected to the encircling structure of the valve body in a manner which forms an absolutely impervious circumferential juncture between this end of the bellows and the valve body. As shown, the inner end of the bellows 60 is rigidly supported on fixed ledges 63 on structure within the valve and circumferentially bonded or fused to the encircling valve body structure by brazing, welding, or the like, as indicated by the numeral 64.

Thus, except for the passages 14, 16 opening into the valve chamber 36 through the annular seats 22, 24, this chamber containing the valve ball 30 and the ball-actuating transmission 34 is completely isolated from the external environment by structure which is absolutely impervious to liquids and completely free of joints in which component elements of the joint move in relation to each other.

Provision is made for holding the input element of the transmission 34, i.e., the plunger 46, against the rotation by the reaction of the transmission output element 44 in rotating the valve ball. For this purpose, an intermediate portion of the plunger 46 extending beyond the disk 54 is splined to a transverse support plate 66 mounted in the bonnet 52 and held against rotation by lugs 68 on the plate which fit into grooves 70 in the valve body.

The plunger 46 is urged outwardly by a compression spring 72 having sufficient force to actuate the transmission 34 and turn the ball 30 from one extreme position to another. In this instance, the cams 40 are shaped to close the valve by outward movement of the plunger 46. The compression spring 72 is mounted between the support plate 66 and an enlarged head 74 on the outer end of the plunger 46.

The outer end of the bonnet 52 is covered by a threaded cup 76 having a pair of ears 78 which support a pivot 80 for an actuating cam 90 engaging the outer end of the plunger head 74.

As shown in FIGS. 1 and 2, the cam 90 is a single lobe cam, which is rotated by a handle 92 between the valve-open position shown in FIGS. 1 and 2 and a valve-closed position (not shown) in which the cam is turned 90 degrees counter-clockwise from the position shown in FIG. 2. Thus, the cam 90 is designed so that rotation of the cam through a quarter-turn effects linear movement of the plunger 46, either by the direct action of the cam or the indirect action of the spring 72, which operates through the transmission 34 to rotate the ball 30 between its open and closed positions.

The valve-operating movement of the plunger 46 is accompanied by a simple elongation or contraction of the bellows 60 which maintains the hermetically sealed integrity of the valve chamber 36 unimpaired.

If desired, manual operation of the valve can be made easier by extending the range of movement of the valve control handle. This is illustrated by a modified form of the improved valve shown in FIG. 6 in which structural components similar to those of the form of the invention just described are designated with the same reference numerals with the addition of the suffix "a." Thus, as shown, the valve operating cam 90a is designed to effect displacement of the plunger 46a through its normal range of movement upon rotation of the cam through a full 180 degree angle by means of the handle 92a. This spreads the effort of opening and closing the valve over a greater angular range of handle movement with a corresponding reduction in the manual force required to move the handle.

In situations in which space limitations or other considerations make it undesirable to use valves with handles which pivot about axes perpendicular to the valve plungers, as described in connection with the forms of valves shown in FIGS. 1, 2 and 6, the modified valve illustrated in FIG. 7 may be used. Component elements of this form of the improved valve similar to those of the previously described valves are designated with the same reference numbers, with the addition of the suffix "b."

Here, the plunger 46b is moved in opposite directions by a transmission 94 generally similar to the transmission 34b used to translate linear movement of the plunger 46b into rotary movement of the valve ball 30b. However, the transmission 94 is arranged to translate into linear movement of the plunger 46 rotary movement of a handle 96 about an axis coinciding with the axis of the plunger 46b.

Structurally, the transmission 94 comprises a pair of cam followers 98 (only one of which is shown in FIG. 7) which project radially from the plunger 46b into a pair of helical cam slots 100 formed in a cylindrical cam member 102 encircling the outer end of the plunger. The cam member 102 fits between a cap 104 on the bonnet 52b and the support plate 66b which together hold the cam member against axial movement. The cam member 102 is rotated by the handle 96 through an operating stem 106 projecting upwardly from the cam member through the cap 104. The helical cam slots 100 (only one of which is shown in FIG. 7) can be designed to provide substantially any desired operating range of rotary movement of the handle 96.

FIGURE 8 shows another more modified form of the improved valve in which component elements similar to those described are designated with the same reference numbers with the addition of the suffix "c." Here, the plunger 46c is moved in opposite directions by means of a threaded stem 108 having a rotatable connection 110 to the outer end of the plunger and extending upwardly through a threaded thrust element 112 mounted on a cap 114 on the valve bonnet 52b. Rotation of the threaded stem 108 by a handle 116 on the stem effects a progressive displacement of the plunger 46c in either direction to open and close the valve.

While worthwhile advantages are realized from the specific forms of the invention illustrated and described, it will be understood that the invention includes structural variants and modifications within the scope of the invention as defined by the claims.

The invention is claimed as follows:

1. A spherical ball valve comprising, in combination, a valve housing, a spherical valve ball in said housing, a pair of valve seats in said housing engaging said ball, said housing defining two separate passages communicating with the respective valve seats, a reciprocable valve actuating plunger mounted in said housing for rectilinear movement toward and away from said ball, anchoring means coacting with said plunger to hold the latter against rotation, coacting cam and follower elements reciprocable relative to each other, said cam element being shaped to force rotation of said cam and follower elements relative to each other as an incident to reciprocation of said elements relative to each other, means connecting one of said elements to said ball to rotate the latter, means connecting the other of said elements nonrotatably to said plunger for reciprocation by the latter relative to said one element, valve operating means coacting with said plunger to move the latter longitudinally in opposite directions to rotate said ball between open and closed positions thereof, a bellows encircling said plunger between said anchoring means and said seats and enclosing the element connected to the ball for rotating the same, means forming an impervious circumferential joint between one end of said bellows and said housing, and means forming an impervious circumferential joint between the other end of said bellows and said plunger whereby the bellows partakes of the rectilinear movement of said plunger.

2. A ball valve comprising, in combination, a valve body, a rotatable valve ball disposed within said body, valve seats engaging said ball, transmission means for translating linear motion into rotary motion, said transmission means including a rotary output member connected to said ball and a reciprocable input member extending outwardly from said output member and mounted for rectilinear movement, a sealing bellows encircling said input member for elongation and contraction in the direction of rectilinear movement of said input member and enclosing said rotary output member, means forming an impervious circumferential joint between one end of said bellows and said body, means forming an impervious circumferential joint between the other end of said bellows and said input member, and valve operating means for reciprocating said input member for rotating said ball between open and closed positions.

3. A ball valve comprising, in combination, a valve body, a rotatable valve ball disposed within said body, valve seats engaging said ball, transmission means for translating linear motion into rotary motion, said transmission means including a rotary output member connected to rotate said ball and a reciprocable input member extending outwardly from said output member and mounted for rectilinear movement, a sealing bellows encircling said input member for elongation and contraction in the direction of rectilinear movement thereof and enclosing said rotary output member, means forming an impervious circumferential static joint between one end of said bellows and said body, means forming an impervious circumferential static joint between the other end of said bellows and said input member, an externally accessible valve control element having a threaded support on said body, and means connecting said control element to said input member for reciprocating the latter to rotating said ball between open and closed positions thereof.

4. A ball valve comprising, in combination, a valve body defining connecting passages thereinto, a rotatable ball valve disposed in said valve body, valve seats encircling the inner ends of said passages and engaging said valve ball, said ball defining a bore therethrough movable into and out of alinement with said seats upon rotation of said ball between open and closed positions, transmission means for translating linear motion to rotary motion, said transmission means including a rotary output member connected to rotate said ball and a reciprocable input member extending outwardly from said output member and mounted for rectilinear movement, a sealing bellows encircling said input member for elongation and contraction in the direction of rectilinear movement of the latter and enclosing said rotary output member, means forming an impervious circumferential joint between one end of said bellows and said body and means forming an impervious circumferential joint between the other end of said bellows and said reciprocable input member to define with said body an inner valve chamber which is hermetically sealed from the external environment except for communication therewith through said passages, and valve operating means external to said chamber and coacting with said input member to move the latter in opposite directions to effect rotation of said ball between open and closed positions thereof.

5. A ball valve comprising, in combination, a housing, a valve ball mounted in said housing, valve seats in said housing engaging said ball, said ball defining a bore therein movable into and out of alinement with said seats upon rotation of said ball between open and closed positions thereof, transmission means for translating linear motion to rotary motion and including input and output elements reciprocable in relation to each other, said elements defining respectively a cam follower and a helical cam coacting with said follower to force relative rotation of said elements as an incident to relative reciprocation thereof, means connecting one of said elements to said ball, anchoring means coacting with the other element to effect rectilinear movement of the latter, an impervious bellows encircling said other element between said anchoring means and said valve seats and enclosing said cam follower and helical cam, means forming an impervious circumferential connection between said other element and one end of said bellows to effect rectilinear effect rectilinear movement of the latter, an impervious circumferential connection between the other end of said bellows and said housing, spring means coacting with said other element to urge the latter outwardly to effect rotation of said ball to an extreme position thereof, rotary cam means mounted on said housing and coacting with the outer end of said other element to displace the latter inwardly against said spring to rotate said ball toward another extreme position thereof.

6. A ball valve comprising, in combination, a valve body defining connecting passages thereinto, a rotatable valve ball disposed in said body, valve seats within said body encircling said passages and engaging said ball, transmission means for translating linear motion to rotary motion and including a rotary driven element connected to rotate said ball and a reciprocable driving element extending outwardly from said driven element and mounted for rectilinear movement, an impervious bellows encircling said transmission means and means forming impervious static circumferential connections between opposite ends of said bellows and said body and said reciprocable driving element whereby the bellows partakes of the rectilinear movement of said driving element and to define with said body an inner valve chamber housing said ball and said rotary driven element and hermetically sealed from the external environment except for communication therewith through said passages, and valve operating means supported on said body in external relation to said chamber and coating with said driving element to move the latter in opposite directions to effect rotation of said ball between open and closed positions thereof.

7. A ball valve comprising, in combination, a valve housing, a rotatable ball disposed in said housing, valve seats in said housing engaging said ball, a first transmission for translating linear motion to rotary motion and including a rotary output element connected to rotate said ball and a reciprocable input element extending outwardly from said output element and mounted for rectilinear movement, a second transmission for translating rotary motion to linear motion and including a rotary input element and a reciprocable output element one of which defines a helical cam and the other of which includes a follower coacting with said cam, the reciprocable output element of said second transmission being connected to said input element of said first transmission, an impervious bellows encircling said input element of said first transmission for elongation and contraction in the direction of rectilinear movement thereof and enclosing the rotary output element of the first transmission, means forming an impervious circumferential static connection between one end of said bellows and said first transmission input element, means forming an impervious circumferential static connection between the other end of said bellows and said housing, and exposed handle means connected to rotate the input element of said second transmission to effect through both said transmissions operating in tandem rotation of said ball between open and closed positions thereof.

8. A ball valve comprising, in combination, a valve body, a rotatable valve ball disposed within said body, and having a passage therethrough, valve seats engaging said ball, valve seat supports for each said valve seat, transmission means for translating linear motion into rotary motion and including a rotary output member connected to said ball and an input member extending outwardly from said output member and mounted for reciprocable rectilinear movement, a sealing bellows encircling said input member for elongation and contraction in the direction of rectilinear movement thereof and enclosing said rotary output member, means forming an impervious circumferential joint between one end of said bellows and said valve body, means forming an impervious circumferential joint between the other end of said bellows and said input member, and a valve operating member for reciprocating said input member to effect rotation of said ball between open and closed positions.

9. A ball valve as claimed in claim 8, wherein the valve operating means comprises an externally accessible rotary cam member engageable with said input member.

10. A ball valve as claimed in claim 8, wherein the valve operating means includes an externally accessible rotary member connected with said input member.

References Cited in the file of this patent
UNITED STATES PATENTS

| | | |
|---|---|---|
| 965,009 | Philbrick | July 19, 1910 |
| 1,155,576 | Isley | Oct. 5, 1915 |
| 1,890,524 | Martin | Dec. 13, 1932 |
| 1,989,942 | Parks | Feb. 5, 1935 |

FOREIGN PATENTS

| | | |
|---|---|---|
| 153,903 | Sweden | of 1956 |
| 1,029,386 | France | of 1953 |
| 1,149,925 | France | of 1957 |